United States Patent

Winther

[15] 3,702,596

[45] Nov. 14, 1972

[54] INCINERATOR SLUDGE CONCENTRATOR COMBINATION

[72] Inventor: John L. Winther, 263 Calle La Mesa, Moraga, Calif. 94556

[22] Filed: Feb. 24, 1971

[21] Appl. No.: 118,245

[52] U.S. Cl....................................110/8 R, 110/15
[51] Int. Cl..............................................F23g 5/04
[58] Field of Search................110/7 R, 8 R, 8 P, 15

[56] References Cited

UNITED STATES PATENTS

| | | | |
|---|---|---|---|
| 2,148,447 | 2/1939 | Dundas et al. | 110/15 |
| 3,218,995 | 11/1965 | Yoshihara et al. | 110/7 |
| 3,592,149 | 7/1971 | Erkrath-Unterbach | 110/15 |
| 3,570,427 | 3/1971 | Winther | 110/8 |

*Primary Examiner*—Kenneth W. Sprague
*Attorney*—Townsend & Townsend

[57] ABSTRACT

Garbage incineration and raw sewage sludge concentration are combined. The hot gas outflow of an incinerator is used to concentrate by dehydration raw sludge received from a sewage clarifier. After simultaneously reducing the moisture content of the raw sludge and scrubbing the exhaust gas, the gases from the incinerator are again scrubbed, typically with the outflow from the clarifier or alternately with raw sewage to remove noxious gases of combustion and particularly to prevent undesirable high vapor content.

6 Claims, 2 Drawing Figures

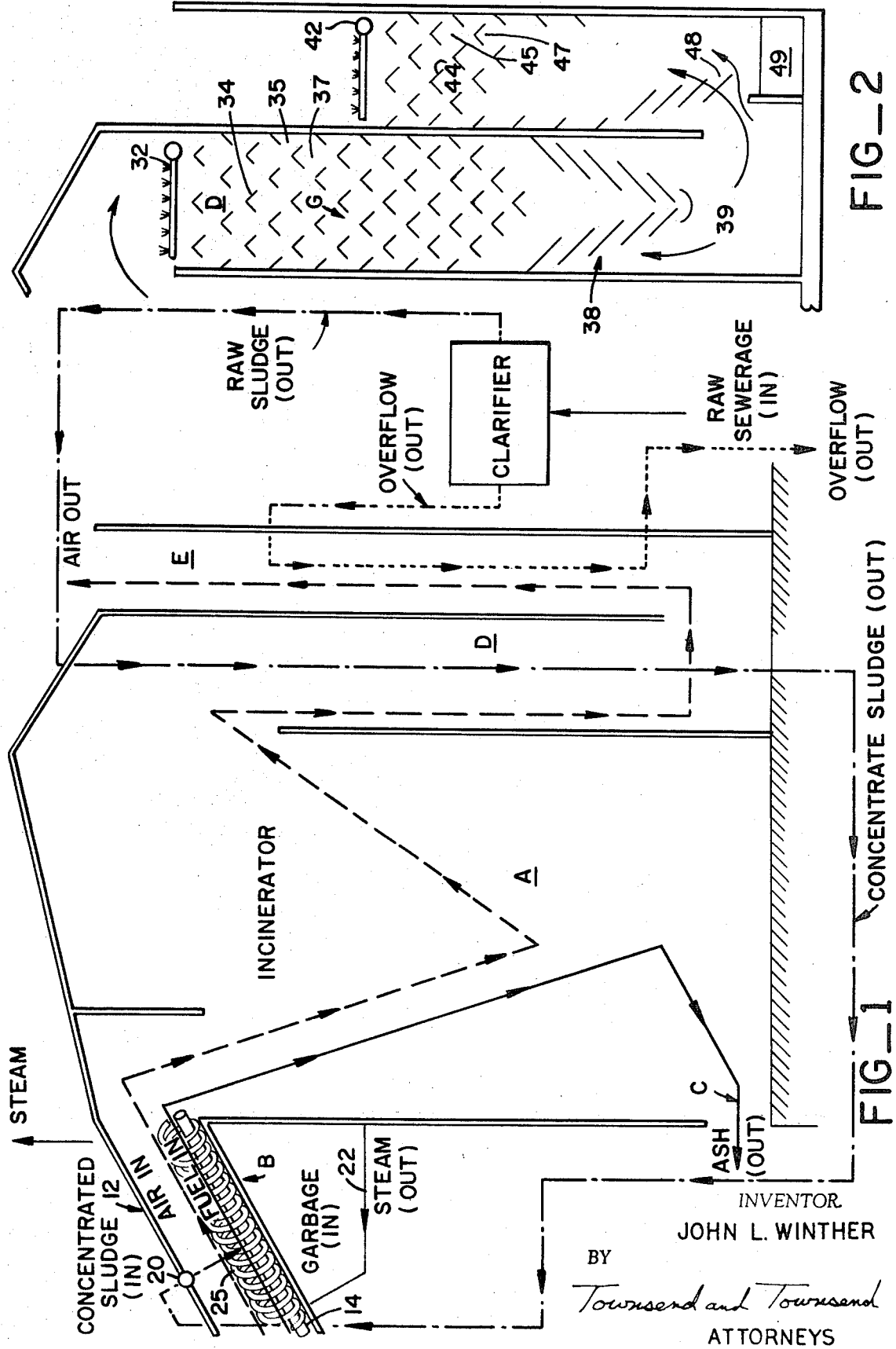

INCINERATOR SLUDGE CONCENTRATOR COMBINATION

This invention relates to the concentration of raw sludge and more particularly to a raw sludge concentrator which is combined with an incinerator to provide an integrated waste disposal facility for use in municipalities.

Waste facilities are commonly divided into sewage treatment facilities and garbage disposal facilities. The main purpose of this invention is to combine sewage and garbage disposal.

With respect to sewage treatment facilities, the solid content of raw sewage is typically separated out mechanically and thereafter oxidized by bacterial action. Such bacterial action takes place in a digester and includes the steps of aeration, filtration, sedimentation, and at least some chemical treatments.

Heretofore, sludge digesters have been the main limitation in the capacity of most municipal sewage treatment plants. First, sludge undergoing a bacterial oxidation is extremely sensitive to variations in the content of the influent. Moreover, large volumes of sludge must be maintained in the typical sewage facility as bacteriological treatment of the sludge is a slow and time consuming process. Finally, even the most efficient digester systems do not process all of the objectionable material from sludge. Subsequent downstream processing is required before this material can be completely removed.

Garbage disposal typically includes either dumping and covering at a dump site or incineration. Where dumping at a dump site is used, no by-product is recovered from the garbage other than unsightly fill at the dump site. Where incineration is used, no useful heat recovery is used from the garbage. Thus, the heat content which can be obtained by burning such corresponding garbage is an unused and frequently untapped source of energy.

It is known to combine sewage sludge treatment, typically by incineration, with refuse incinerators. Typically, this is done by introducing sludge directly into the incinerator's main combustion chamber.

This process has the unfortunate side effect of reducing combustion efficiency and resulting in an incinerator output ladened with undesirable partially combusted by-products. This occurs because sludge with a high moisture content cools the interior of the incinerator to a point where the secondary combustion of gases released in primary combustion of the solids is prevented.

An object of this invention is to provide for the concentration by dehydration of raw sludge in the exhaust gases of a garbage incinerator. Typically, raw sludge is introduced into parallel unidirectional down flow with down flowing exhaust gases of the incinerator. Contact heat exchange from the hot incinerator exhaust gases evaporates the high moisture content from raw sludge to produce sludge concentrate can thereafter be either incinerated or otherwise treated as a by-product of the waste disposal system.

An advantage of this sludge concentrator incinerator combination is that the per capita content of garbage can be used to concentrate by dehydration the per capita output of sludge.

A further advantage of this sludge concentrator system is that the critical bacteriological sensitivity to system influent is removed; in the combustion concentration process herein disclosed, wide variations of influent content can be processed.

A further advantage of this combined incinerator sewage disposal facility is that the necessity of digester supernatant recycling, common to digester facilities, is eliminated. With the elimination of supernatant recycling, the size of the facility is reduced and capacity increased.

A further advantage of this invention is that large volumes of sludge can be treated in a sewage plant having a small storage volume. Moreover, when an incinerator of the type disclosed is incorporated within an existing sewage treatment plant, the capacity to handle sludge can be greatly increased.

A further advantage of this system is that the sludge can be combusted; the output of the disclosed municipal sewage and refuse incineration plant is only a sterile ash.

An advantage of this parallel and unidirectional down flow of the exhaust gases and sludge is that inadvertent ignition of the sludge is prevented. Typically, the hot gases of low moisture content are rapidly cooled and saturated by the high moisture content of the sludge to a point where inadvertent combustion of the sludge will not occur.

Yet another advantage of this invention is that the concentration of the sludge occurring in the sludge concentrator located at the incinerator exhaust is separated from the combustion of the sludge occurring in the incinerator itself. The sludge output from the sludge concentrator in the incinerator exhaust can be controlled as the moisture content is maintained at a constant level so that the efficiency of combustion within the incinerator is not destroyed.

An additional advantage of this invention is that sludge concentration occurs at a location where it does not interfere with the secondary combustion of gases released in primary combustion of solids occurring within the incinerator. As efficient combustion at high temperatures in the range of 1,500° F can occur, the exhaust gas output of the incinerator comprises a fully combusted air fuel mixture.

Yet another advantage of this invention is that the sludge concentrator acts as a primary scrubber. Particulate matter received from the incinerator will be captured during the sludge concentration process with corresponding reduction of pollutants. The burden on the downstream scrubbing process is correspondingly reduced.

A further object of this invention is to provide for scrubbing of gases exhausted from the incinerator through the sludge concentrator by the high moisture content of raw sewage or sewage overflow. Typically, the sewage overflow or raw sewage is down flowed and counter-flowed in parallel with the rising gases from the incinerator.

An advantage of this scrubbing process is that the outflow of moisture from the sludge cooled and moisture laden exhaust gases provides for condensation about solid particles contained in the gases. An extremely efficient particle removal from the exhaust gases of the incinerator occurs.

A further advantage of this scrubbing process is that the water condensation from the exhaust gases readily condenses and thereafter absorbs the noxious sulfur, nitrogen, and carbon oxides from the incinerator's gas exhaust.

Yet another advantage of this invention is that the residual detergent composition of the liquids in raw sewage can be utilized to provide an unusually efficient scrubbing solvent.

Yet another advantage of this scrubbing process is that the presence of a vapor flume is reduced.

Still another object of this scrubbing process is that the overflow of the primary clarifier is heated, with the additional heat energy added to the overflow, further treatment of the overflow can be more efficient.

A further object of this invention is to provide an incinerator flow path which can be more efficiently used in combination with sewage treatment. Accordingly to this aspect, an incinerator is exhausted to provide in sequence a down flow section and up flow section. Sludge concentration can occur in the down flow section flowing parallel to and in the same direction as gases from the incinerator. Scrubbing can occur in the up flow section, flowing parallel and counter to the up flowing exhaust gases.

An advantage of this incinerator gas outflow arrangement is that s short ducting of the incinerator exhaust gases with a corresponding minimum heat loss from the incinerator exhaust gases occurs.

Other objects, features and advantages of this invention will be more apparent after referring to the following specification and attached drawings in which:

FIG. 1 is a schematic in section illustrating the incinerator sludge concentrator of this invention with the gaseous path being shown in broken lines, the liquid path being shown in dotted lines, the sludge path being shown in dashed and dotted lines and the garbage ash path being shown in solid lines; and, FIG. 2 is a schematic in section of the down flow and up flow incinerator exhaust gas ducts with their respective sludge concentration and sewage liquid scrubbing illustrated in schematic but with greater attention to detail.

With reference to FIG. 1, a garbage incinerator A is shown having a fuel and air inlet B, and an ash outlet C. The gases of combustion are exhausted from the top of incinerator A to downward exhaust flume D and thence to upward exhaust flume E. The incinerator A and its associates parts are generally of the type described in my co-pending application Ser. No. 875,177, filed Nov. 10, 1969, entitled "Incinerator," now U.S. Pat. No. 3,570,422.

Sewage is typically received at a clarifier F, an apparatus well understood in the art. The clarifier separates raw sludge, a mixture containing approximately 3 percent solids, from the overflow. This raw sludge is thereafter piped to baffles G and down flowing flume E. The liquid portion or overflow from clarifier F is piped to upwardly flowing flume E at baffles H.

Having set forth the general elements of the flow diagram of FIG. 1, the operation of the illustrated apparatus can be outlined. Briefly, fuel inlet B conveys garbage into which concentrated sludge has been formed to a point at the uppermost portion of incinerator A. Thereafter, the garbage is deposited interior of the incinerator and combusted with a resultant ash flow outwardly at C and a gas flow outwardly to flumes D and E. At flume D raw sludge of a 3 percent solid content is introduced into parallel down flow with the gases of combustion. The heat from the gases of combustion are transferred to the sludge. The moisture from the sludge is transferred to the down flowing gases. The resultant gas at the bottom of flume D has an increased moisture content while the outflowing sludge has a reduced moisture content.

When the gases of combustion pass upwardly through flume E, sewage overflow is counter-flowed through them. This counter-flowing sewage overflow reduces the temperature of the exhaust gases to a point where moisture initially acquired in flume D condenses and falls out of the air. The result is a condensation of the moisture in the air around solid particles entrained in the air with extremely efficient solid particle scrubbing. Moreover, the overflow when passed from the stack absorbs most of the noxious gases of combustion. The result is that a relatively low emission of moisture particles, and noxious gases occurs.

The detailed construction of incinerator A will not be set forth. Reference to my patent application Ser. No. 875,177, filed Nov. 10, 1969 entitled "Incinerator" now U.S. Pat. No. 3,570,422 will be sufficient to completely understand the construction of the incinerator.

Fuel inlet B to incinerator A includes an enclosed tunnel 12 having an endless conveyor 14 placed therein. The lower end of the upper flight of endless conveyor 14 defines the surface onto which garbage is placed. Thereafter the garbage mixture is transported upwardly to the end of the conveyor and interior of the incinerator A.

Sludge concentrate is typically sprayed onto the upper surface of the conveyed garbage from a header 20. This sludge concentrate travels with and is combined with garbage on the conveyor. It will be therefore understood that the fuel for incinerator A consists of a garbage mixture sprayed with concentrated sludge.

It should be understood that with the sludge concentrator of this invention in the exhaust gas outflow from the incinerator, that the treated sludge can be introduced directly into the primary combustion area of the incinerator. With the low moisture content of the sludge attained, no interference with the combustion of gases released from the primary incineration will occur.

Naturally, the decision whether to introduce the sludge onto the garbage conveyor in tunnel B or to introduce it directly into the incinerator will depend upon several factors. These factors will include the nature of the conveyance equipment, the availability of steam for pre-heating, and the relative quantities of garbage and sludge being processed through the combined unit.

A specific example will assist the understanding of this invention. Typically, a commercial unit of the type described will be designed for the disposal of 3,000 tons of garbage per day. Consequently 4,167 pounds per minute of the garbage must be introduced interior of incinerator A.

It will be noted that a heat balance is outlined in the following portion of the specification. This balance, assumes what are believed to be reasonable approximations for the treatment system. Abbreviations in the balance have been made including considering only the enthalpy of the air and moisture. Chemical heat, enthalpy of solids and heat losses are for the most part ignored.

It is my estimate that the average heat value of municipal garbage will be approximately 5,000 BTU per pound at a moisture content of approximately 30 percent by weight. Consequently, 7.5 pounds of dry air will be required for the combustion of each pound of garbage for a total of 31,253 pounds of air per minute flow.

Assuming that the ambient air is at 70° F and 80 percent relative humidity the total inflow enthalpy of the air fuel mixture will be approximately 21,788,317 BTU per minute.

Referring to my above referenced patent application, it will be noted that the incinerator A is designed to have a steam by-product. At least a portion of this steam by-product is channeled through piping 22 to a coil 25 interior of tunnel 12. Coil 25 keeps the inflowing fuel air mixture at a temperature in the range of 200° F.

Referring to my above referenced patent application it will be seen that incinerator A has inlets other than the inlet at tunnel 12. Approximately 10 percent of the air will enter through the ash outflow and the sidewalls of the incinerator construction described in the above referenced patent application.

After combustion has occurred interior of incinerator A, it is desired that air entering into the down flowing flume D to be at an exhaust temperature of 1,600° F. To achieve this outflow approximately 3,150 BTU per pound heat energy of the original 5,000 BTU per pound of fuel energy must be transferred to the exhaust gases. The remaining 1,850 BTU per pound will be consumed in thermal losses through the incinerator sidewalls, combustion inefficiencies, and the extraction of the heat for the steam.

As has been previously described, raw sludge will be added at the top of down flowing flume B. Typically, this sludge will pass through a series of baffles G. While FIG. 2 described baffles G in some detail, it should be understood that any number of baffles may be sufficient for the down flow. Typically, the scrubber should provide an agitated flow path on the wetted surface of the baffle for the down flowing raw sludge. The provided fluid flow path should be in fluid interference with but parallel to and in the same direction as the outflowing gases from the furnace.

The flow from the top of down flowing flume D to the bottom of down flowing flume D is designed to produce a solid concentration of at least 35 percent and preferably in the order of 40 percent. Accordingly, approximately 92 percent of the entering volume of 3 percent solid raw sludge will be vaporized leaving the remaining 8 percent as concentrated sludge.

It should be noted that the raw sludge flow rate will be relatively high. Typically, and assuming the 4,167 pounds per minute input of fuel, a raw sludge flow rate of 11,305 pounds per minute or approximately 2.71 pounds of sludge at 3 percent solids per pound of garbage can be concentrated. It is significant to point out that this is a higher sludge to garbage ratio than is normally produced by a given population.

Referring to FIG. 2, down flowing flume D and a construction of baffles G can be illustrated. Typically, sludge is introduced into flume D at manifold 32. The sludge is mixed with and falls downwardly with the exhaust gases.

The sludge gas mixture falls onto a series of roof shaped baffles 34 aligned in alternate baffle rows 35 and 37. Baffle rows 35 are aligned to intercept the flow path of the gas sludge mixture not intercepted by baffle rows 37. Similarly baffle rows 37 are aligned to intercept the flow path of the gas sludge mixture not intercepted by baffle rows 35.

Upon falling through alternate rows 35 and 37 of roof shaped baffles 34 the sludge passes to a series of collector baffles 38 and to a collector trough 39 at the bottom of down flowing exhaust flume D. At this point, the sludge is collected and piped for further treatment as a by-product of the system or preferably to the incoming fuel mixture to the incinerator. This has already been indicated in the description of FIG. 1.

At the bottom of down flowing flume D the temperatures of the exhaust gases will be reduced to a range approximating 167° F. Typically, 0.39 pounds of moisture will be suspended in each pound of dry air for a total of 12,189 pounds per minute.

From the bottom of down flowing flume D the exhausted gases will pass upwardly through up flowing flume E. The gases will be detoured upwardly and around baffles H. At the same time, sewage overflow from clarifier F will be passed downwardly from the top of up flowing flume E to the bottom of the up flowing flume E. The results will be a parallel and counter-flowing agitated flow path of the sewage and air on the wetted surface provided by the baffles. Fluid flow in interference with the outflowing gases of the furnace will occur.

Again referring to FIG. 2, the scrubbing of the exhaust gases and up flowing flume D by baffles F can be conveniently illustrated. Typically, the overflow is introduced into flume at a manifold 42. The overflow is mixed with but falls downwardly and in opposition to the up flowing exhaust gases passing out of the incinerator.

The overflow gas mixture flow is in opposition to each other. Typically, the overflow falls onto a series of roof shaped baffles 44 aligned in alternate baffle rows 45 and 47. Similar to the baffle rows 35 and 37 in flume D, baffles 45 and 47 of flume E are alternately aligned so that overflow missing one of the baffles in one row falls upon an alternate baffle in an alternate row.

At the bottom of flume E the overflow is deflected by a series of collection baffles 48 and into a collection trough 49 where it is collected at a drain (not shown) and moved for downstream processing.

It will be noted that the distance between manifolds 42 and collection trough 49 is shorter than the distance between manifold 32 and collection trough 39. This leaves upper portion of the stack in the schematic of FIG. 2 not occupied.

In this area additional attachment to the incinerator may be placed. These attachments can include induced draft fans for pulling gases through the incinerator, air pre-heating and chemical deodorizing attachments if desired.

It should be realized that whereas overflow from a clarifier has been used as the scrubbing liquid, raw sewage with its relatively low solid content (in the order of 0.01 percent) can just as efficiently be used for scrubbing.

Using the assumed heat flow consideration, approximately 761,025 pounds of sewage overflow at 70° F will be entered into upward portion of baffles H at the upper end of up flowing flume E. The resultant air temperature of the outflowing exhaust will be 80° F and the resultant temperature of the overflow will be 88° F.

It should be noted that the illustration specifically setting forth the thermodynamic parameters of this invention has been by way of an example of a preferred embodiment only. Naturally, as the respective systems increase or decrease in size, corresponding changes in the parameters set forth herein will occur. Moreover, some alterations may be made in both the heat contents of the inflowing gases, and fuels as well as the moisture content of the gases, fuels and scrubbing fluids. Likewise, other modifications can be made to this invention without departing from the spirit and scope thereof.

I claim:

1. In combination: an incinerator chamber; means for supplying fuel to said chamber; means for combusting said fuel in said chamber; first and second exhaust passages from said incinerator; said first exhaust passage communicating at an upper end to the interior of said incinerator for receiving exhaust gases and communicating at the lower end to said second exhaust passage; said second exhaust passage communicating at its lower end to said outlet of said first exhaust passage and passing upwardly to exhaust gases of combustion from said incinerator; means for introducing sludge to an upper portion of said first exhaust passage and collecting sludge at a lower portion of said first exhaust passage; and means intermediate said inlet and said outlet in said first exhaust passage for providing an agitated flow path in said passage in fluid interference with but parallel to and in the same direction as the outflowing gases from said furnace.

2. The invention of claim 1 and further including means for introducing fluid sewage at the upper portion of said second exhaust passage and means for collecting said fluid sewage at the lower portion of said exhaust passage; and, means intermediate said inlet and outlet for providing a flow path for said fluid sewage in fluid opposition to and counter to the outflowing exhaust from said furnace.

3. The invention of claim 2 and including means for conveying said sludge to said incinerator for combustion with said fuel after collection at the bottom of said first passages.

4. An incinerator having a fuel inflow, an enclosed area for combusting said fuel and an exhaust gas outflow, the improvement comprising an exhaust gas outflow including a first down flowing flume communicated at said upper end to the outflow from said incinerator and at the lower end to a second flume; a second flume communicated at its lower end to the outflow from said first flume and at its upper end to atmosphere; and inlet for pumping sludge into the upper end of said first flume and an outlet for receiving said sludge at the lower end of said first flume; and means intermediate said inlet and said outlet interior of said first flume for providing a flow path to said sludge in fluid interference with the flow path of said exhaust gases.

5. The invention of claim 4 and including an inlet for introducing fluid sewage into the top of said second flume and for receiving fluid sewage at a bottom of said second flume and means intermediate said inlet and outlet interior of said second flume for providing a sewage flow path in fluid opposition to gases outflowing from said second flume.

6. A process for simultaneously concentrating sludge and exhaust gases from an incinerator comprising the steps of: down flowing the exhaust gases from said incinerator in a first flume; receiving and up flowing the exhaust gases from said first flume in a second flume; simultaneously with said down flowing step introducing raw sludge at the upper portion of said first flume and collecting said raw sludge at the lower portion of said first flume; introducing fluid sewage at the upper portion of said second flume and collecting said fluid sewage at the lower portion of said second flume; and flowing said sludge and said fluid sewage intermediate said inlet and outlets in fluid interference with said exhaust gases from said furnace.

* * * * *